US012562301B2

(12) United States Patent
Zhu et al.

(10) Patent No.: US 12,562,301 B2
(45) Date of Patent: Feb. 24, 2026

(54) INDUCTOR AND RELATED APPARATUS

(71) Applicant: Huawei Digital Power Technologies Co., Ltd., Shenzhen (CN)

(72) Inventors: Jianhua Zhu, Dongguan (CN); Dongchen Zhao, Vienna (AT); Hua Jiang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 720 days.

(21) Appl. No.: 18/064,186

(22) Filed: Dec. 9, 2022

(65) Prior Publication Data

US 2023/0112288 A1      Apr. 13, 2023

Related U.S. Application Data

(63) Continuation of application No. PCT/CN2020/095252, filed on Jun. 10, 2020.

(51) Int. Cl.
| | |
|---|---|
| *H01F 27/26* | (2006.01) |
| *H01F 27/30* | (2006.01) |
| *H02J 7/00* | (2006.01) |

(52) U.S. Cl.
CPC .......... *H01F 27/26* (2013.01); *H01F 27/306* (2013.01); *H02J 7/0068* (2013.01)

(58) Field of Classification Search
USPC ........................................................ 320/128
See application file for complete search history.

(56) References Cited

U.S. PATENT DOCUMENTS

| | | | | |
|---|---|---|---|---|
| 2007/0024233 A1* | 2/2007 | Ekchian | ............... | H02K 7/1861 320/101 |
| 2008/0061105 A1* | 3/2008 | Zachrisson | ............... | B25C 1/06 320/132 |
| 2017/0326992 A1* | 11/2017 | Budhia | ................... | H02J 50/10 |
| 2023/0112288 A1* | 4/2023 | Zhu | ..................... | H02M 1/0064 320/128 |

FOREIGN PATENT DOCUMENTS

| | | |
|---|---|---|
| CN | 202839232 U | 3/2013 |
| CN | 103595367 A | 2/2014 |
| CN | 103943330 A | 7/2014 |
| CN | 204632497 U | 9/2015 |
| CN | 105895302 A | 8/2016 |
| EP | 2889884 A2 | 7/2015 |

* cited by examiner

*Primary Examiner* — Mohammed Alam
(74) *Attorney, Agent, or Firm* — Slater Matsil, LLP

(57) ABSTRACT

An inductor and a related apparatus are provided. The inductor includes an upper magnet yoke and a lower magnet yoke that are straight-shaped and are disposed in parallel. A first winding disposed on a first fiber post, and a second winding disposed on a second fiber post. The upper magnet yoke, a first upper fiber post, and a second upper fiber post are integrally molded. The lower magnet yoke, a first lower fiber post, and a second lower fiber post are integrally molded. A clockwise/counterclockwise direction of a current in the first winding is consistent with a clockwise/counterclockwise direction of a current in the second winding.

20 Claims, 8 Drawing Sheets

Common post

Lower magnet yoke

Third fiber post

First fiber post

Second fiber post

Sampling module 201

Inductor 203

Processing module 202

Main transistor 204

Current sharing circuit

INDUCTOR AND RELATED APPARATUS

CROSS-REFERENCE TO RELATED APPLICATIONS

This application is a continuation of International Application No. PCT/CN2020/095252, filed on Jun. 10, 2020, the disclosure of which is hereby incorporated by reference in its entirety.

TECHNICAL FIELD

This application relates to the field of electronic technologies, and in particular, to an inductor and a related apparatus.

BACKGROUND

An inductor is a component that can convert electric energy into magnetic energy for storage. A structure of the inductor is similar to that of a transformer. The inductor has a specific inductance that only blocks a current change. If the inductor is in a state in which no current is flowing through, the inductor attempts to prevent the current from flowing through the inductor when a circuit is connected. If the inductor is in a state in which there is a current flowing through, the inductor attempts to maintain the current unchanged when a circuit is disconnected. The inductor is also referred to as a choke, a reactor, or a dynamic reactor.

The inductor is a common component in a direct current/direct current (DC/DC) circuit, and the direct current/direct current circuit is widely used in a power supply circuit. As power output by the power supply circuit increases, a winding in the inductor needs to carry a relatively large direct current component. It is known that the Gauss's law for magnetism is $\Phi=B*S$, where $\Phi$ represents a magnetic flux, B represents magnetic induction intensity (also referred to as magnetic flux density, magnetic density for short), and S represents an area. However, under a condition that a volume of the inductor is limited, a direct current magnetic flux generated by the direct current component causes magnetic density of a fiber post in the inductor to be excessively high, and saturation occurs.

When the magnetic density of the fiber post in the inductor is excessively high and saturation occurs, current distortion caused may affect reliability of an entire circuit. Therefore, a new type of inductor is needed to resolve the foregoing technical deficiency.

SUMMARY

In view of this, a first aspect of embodiments of this application provides an inductor. The inductor includes: an upper magnet yoke and a lower magnet yoke, where the upper magnet yoke and the lower magnet yoke are straight-shaped magnet yokes, and the upper magnet yoke and the lower magnet yoke are disposed in parallel; a first fiber post, where a first winding is disposed on the first fiber post, the first fiber post is disposed between the upper magnet yoke and the lower magnet yoke; and a second fiber post, where a second winding is disposed on the second fiber post, the second fiber post is disposed between the upper magnet yoke and the lower magnet yoke. The first fiber post includes a first upper fiber post, a first lower fiber post, and a first air gap, the first upper fiber post, the first lower fiber post, and the first air gap are located on a same axis, the first air gap is provided between the first upper fiber post and the first lower fiber post, and the first air gap includes one or more air gaps. The second fiber post includes a second upper fiber post, a second lower fiber post, and a second air gap, the second upper fiber post, the second lower fiber post, and the second air gap are located on a same axis, the second air gap is provided between the second upper fiber post and the second lower fiber post, and the second air gap includes one or more air gaps. The upper magnet yoke, the first upper fiber post, and the second upper fiber post are integrally molded. The lower magnet yoke, the first lower fiber post, and the second lower fiber post are integrally molded. Optionally, a magnetic core pressing manner is used for integrated molding. Optionally, a magnetic core pressing manner is used for integrated molding. Processing difficulty is reduced, magnetic core costs are reduced, an inductance tolerance of a finished inductor is effectively reduced, and a price/performance ratio of the inductor is improved.

The first winding is coupled to the second winding, and a clockwise/counterclockwise direction of a current in the first winding is consistent with a clockwise/counterclockwise direction of a current in the second winding, so that a direct current magnetic flux generated by the first winding in the first fiber post is offset by a direct current magnetic flux generated by the second winding in the second fiber post.

In this embodiment of this application, the upper magnet yoke and the lower magnet yoke that are included in the inductor are straight-shaped magnet yokes, and the upper magnet yoke and the lower magnet yoke are disposed in parallel. Compared with an inductor that uses a T-shaped magnet yoke, the inductor provided in this embodiment of this application cancels a common post. Therefore, current distortion caused when magnetic density of the common post is excessively high and saturation occurs is avoided. In addition, the first winding is coupled to the second winding, and the clockwise/counterclockwise direction of the current in the first winding is consistent with the clockwise/counterclockwise direction of the current in the second winding, so that the direct current magnetic flux generated by the first winding in the first fiber post is offset by the direct current magnetic flux generated by the second winding in the second fiber post. This avoids a case in which a direct current magnetic flux generated by a winding in a fiber post causes magnetic density of the fiber post in the inductor to be excessively high, and saturation occurs. Further, a technical deficiency of current distortion caused when magnetic density of the fiber post in the inductor is excessively high and saturation occurs is avoided. Reliability of a circuit to which the inductor is applied is improved. The inductor is enabled to withstand instantaneous overload power without saturation, and a short-time overload capability is improved. The upper magnet yoke and the lower magnet yoke and the fiber post may use an integrated molding technology, having advantages such as simple processing, and high inductance consistency of a finished inductor.

With reference to the first aspect, in an optional implementation of the first aspect, the upper magnet yoke, the lower magnet yoke, the first fiber post, and the second fiber post use a power ferrite material, for example, a manganese zinc ferrite material, or may be a material such as ferrite, silicon steel, an amorphous material, ferrosilicon aluminum, ferrosilicon, or a nano-crystalline material. In this embodiment of this application, a magnet yoke and the fiber post may use a plurality of different materials, so that solution implementation flexibility is improved.

With reference to the first aspect, in an optional implementation of the first aspect, the inductor further includes at least one third fiber post and at least one third winding. The third winding is disposed on the third fiber post. The clockwise/counterclockwise direction of the current in the first winding, the clockwise/counterclockwise direction of the current in the second winding, and a clockwise/counterclockwise direction of a current in the third winding are consistent, so that the direct current magnetic flux generated by the first winding in the first fiber post, the direct current magnetic flux generated by the second winding in the second fiber post, and a direct current magnetic flux generated by the third winding in the third fiber post are offset. The third fiber post includes a third upper fiber post and a third lower fiber post. An upper end of the third upper fiber post is connected to the upper magnet yoke, and a lower end of the third lower fiber post is connected to the lower magnet yoke. The first upper fiber post, the second upper fiber post, the third upper fiber post, and the upper magnet yoke are integrally molded. The first lower fiber post, the second lower fiber post, the third lower fiber post, and the lower magnet yoke are integrally molded. Optionally, a sintering manner is used for integrated molding. Optionally, a magnetic core pressing manner is used for integrated molding.

In this embodiment of this application, the first winding, the second winding, and the third winding are mutually independent. The clockwise/counterclockwise direction of the current in the first winding, the clockwise/counterclockwise direction of the current in the second winding, and the clockwise/counterclockwise direction of the current in the third winding are consistent, so that the direct current magnetic flux generated by the first winding in the first fiber post, the direct current magnetic flux generated by the second winding in the second fiber post, and the direct current magnetic flux generated by the third winding in the third fiber post are offset, thereby significantly improving an anti-saturation capability of the inductor. The inductor can use a plurality of fiber posts and a plurality of windings to meet different circuit requirements.

With reference to the first aspect, in an optional implementation of the first aspect, when the inductor includes two fiber posts and two windings, a phase difference between currents in the two windings is 180°. When the inductor includes three fiber posts and three windings, a phase difference between currents in the three windings is 120°. When the inductor includes N fiber posts and N windings, a phase difference between currents in the N windings is 360°/N, where N is a positive integer. In this embodiment of this application, by specifying a phase difference between currents in windings of the inductor, it is ensured that under an alternating current condition, a case in which a direct current magnetic flux generated by the winding in the fiber post causes magnetic density of the fiber post in the inductor to be excessively high, and saturation occurs is avoided.

With reference to the first aspect, in an optional implementation of the first aspect, a cross-sectional shape of the first fiber post includes a circular shape, an oval shape, an ovoid shape, a quadrate shape, a rectangular shape, or a polygonal shape. A cross-sectional shape of the second fiber post includes a circular shape, an oval shape, an ovoid shape, a quadrate shape, a rectangular shape, or a polygonal shape. In this embodiment of this application, a cross-section of the fiber post in the inductor may be in a plurality of different shapes, to meet different circuit requirements.

With reference to the first aspect, in an optional implementation of the first aspect, a coupling coefficient of the inductor is negatively correlated with a spacing between fiber posts, the coupling coefficient of the inductor is increased by reducing the spacing between the fiber posts, and the coupling coefficient of the inductor is reduced by increasing the spacing between the fiber posts. In this embodiment of this application, the coupling coefficient of the inductor is adjusted by adjusting the spacing between the fiber posts, and requirements of different inductances and offsetting a magnetic flux in the circuit are met.

According to a second aspect, an embodiment of this application provides a current sharing circuit, including a sampling module, a processing module, and the inductor according to any one of the first aspect or the implementations of the first aspect.

The sampling module is configured to perform current sampling on a first winding and a second winding of the inductor to respectively obtain a first current signal and a second current signal. The first current signal is a signal of a current in the first winding, and the second current signal is a signal of a current in the second winding.

The processing module is configured to adjust a duty cycle of a main transistor of the first winding and a duty cycle of a main transistor of the second winding based on the first current signal and the second current signal, so that a direct current component of the current of the first winding is consistent with a direct current component of the current of the second winding, and a direct current magnetic flux generated by the first winding in a first fiber post is dynamically offset in real time by a direct current magnetic flux generated by the second winding in a second fiber post.

When the inductor further includes a third winding, the sampling module is further configured to perform current sampling on the third winding of the inductor to obtain a third current signal. The third current signal is a signal of a current in the third winding. The processing module is further configured to adjust the duty cycle of the main transistor of the first winding, the duty cycle of the main transistor of the second winding, and a duty cycle of a main transistor of the third winding based on the first current signal, the second current signal, and the third current signal, so that the direct current component of the current of the first winding, the direct current component of the current of the second winding, and a direct current component of the current of the third winding are consistent.

The sampling module includes at least one Hall sensor, at least one current transformer, at least one resistive current divider, or at least one magnetoresistive current sensor. The processing module includes at least one operational amplifier or at least one micro controller unit.

In this embodiment of this application, the current sharing circuit adjusts the duty cycle of the main transistor of the first winding and the duty cycle of the main transistor of the second winding based on the first current signal and the second current signal, so that the direct current component of the current of the first winding is consistent with the direct current component of the current of the second winding. Therefore, a technical deficiency that magnetic density in the fiber post is excessively high and saturation occurs when a magnetic flux in the fiber post cannot be completely offset because of inconsistent direct current components caused by different component parameters is overcome, thereby further improving circuit reliability.

According to a third aspect, an embodiment of this application provides a direct current/direct current switch power supply. The direct current/direct current switch power supply includes the current sharing circuit according to the second aspect.

According to a fourth aspect, an embodiment of this application provides a modular power supply. The modular power supply includes the current sharing circuit according to the second aspect.

According to a fifth aspect, an embodiment of this application provides a battery management system, including a battery and the current sharing circuit according to the second aspect. The battery is configured to provide electric energy. The current sharing circuit is configured to control charging and discharging of the battery. Specifically, the current sharing circuit is integrated into a switch module of the battery management system, to implement bidirectional current control and bidirectional boost or buck output by controlling turning on and turning off of a switching transistor. Optionally, the switch module may be integrated with the battery, or may separately form an independent module.

Figure 2:
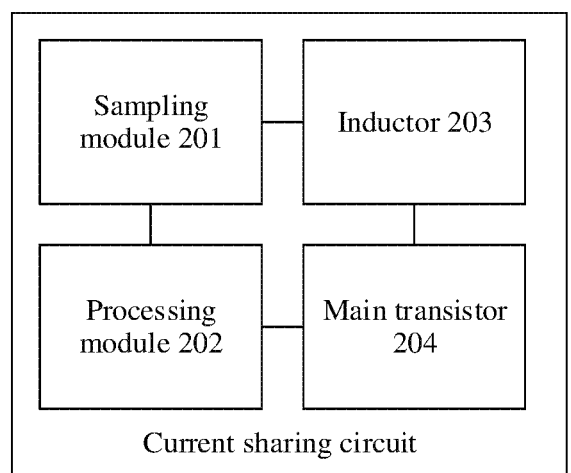
Figure 3A:
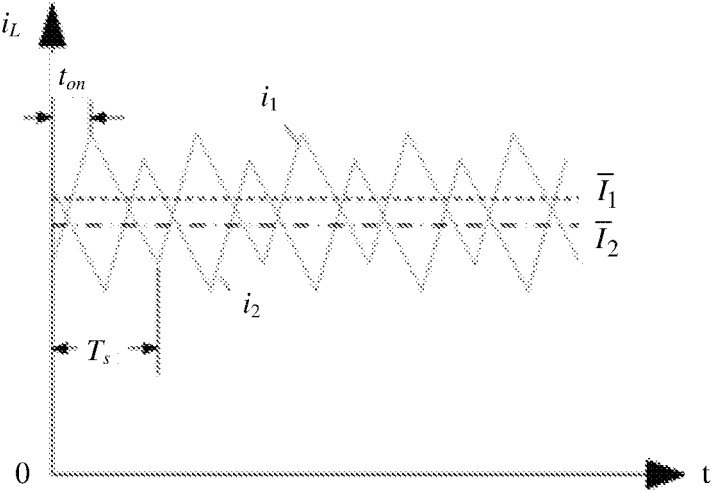
Figure 3B:
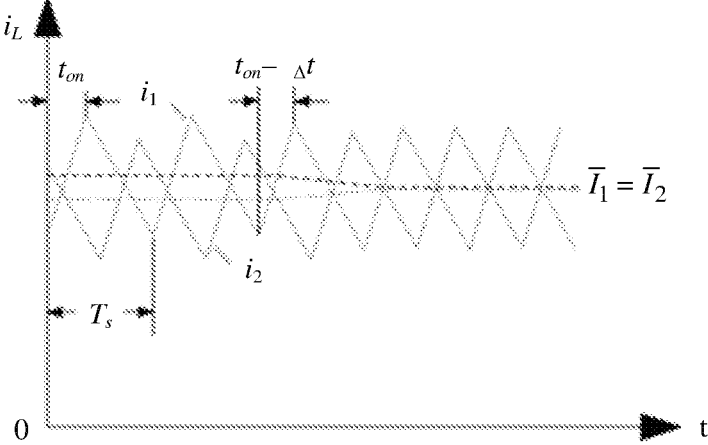
Figure 4A:
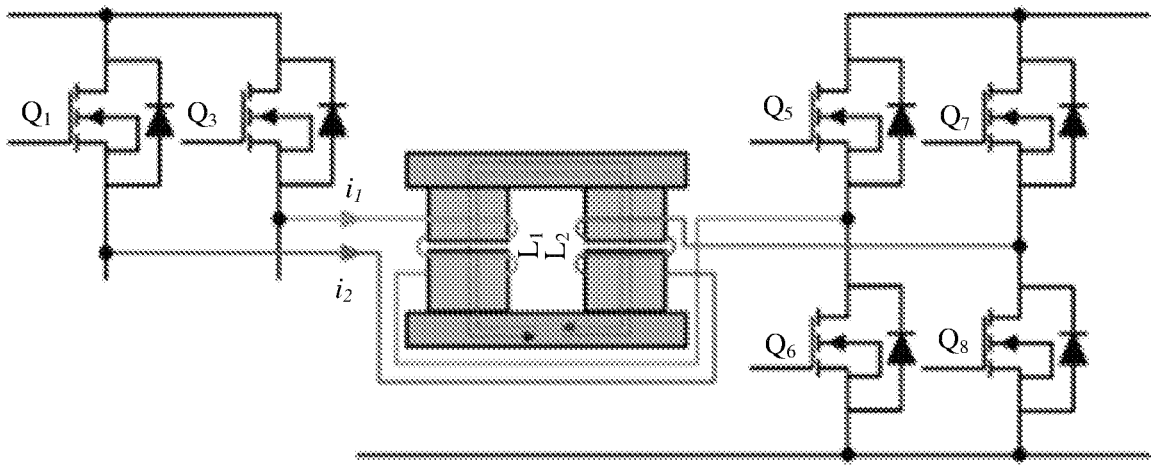
Figure 4B:
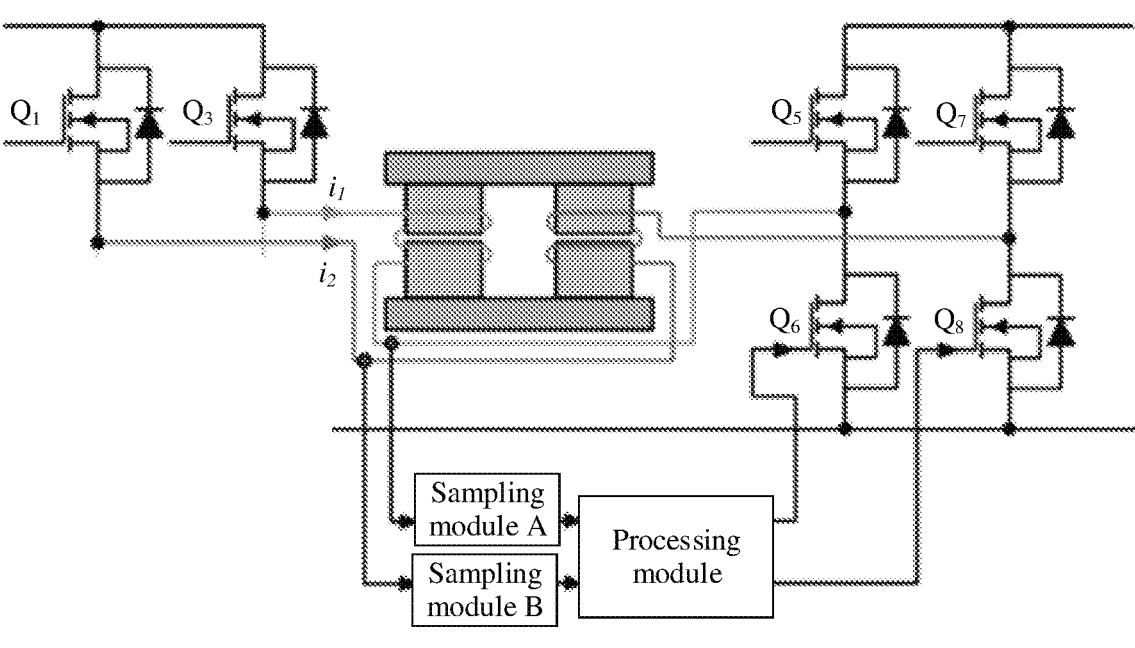
Figure 4C:
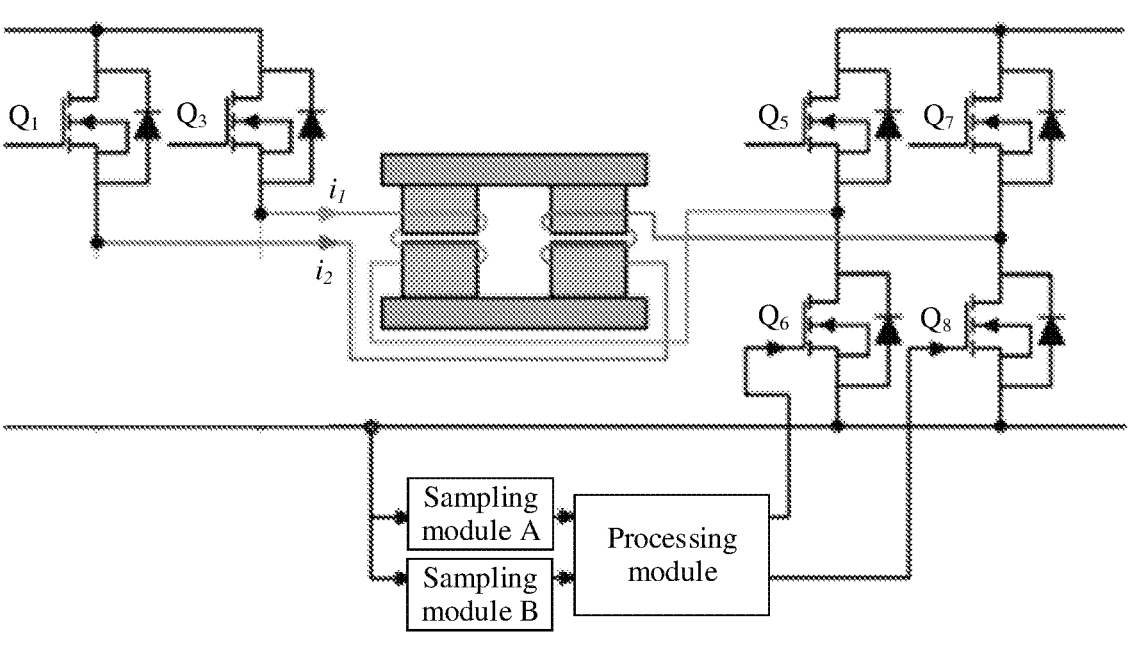
Figure 4D:
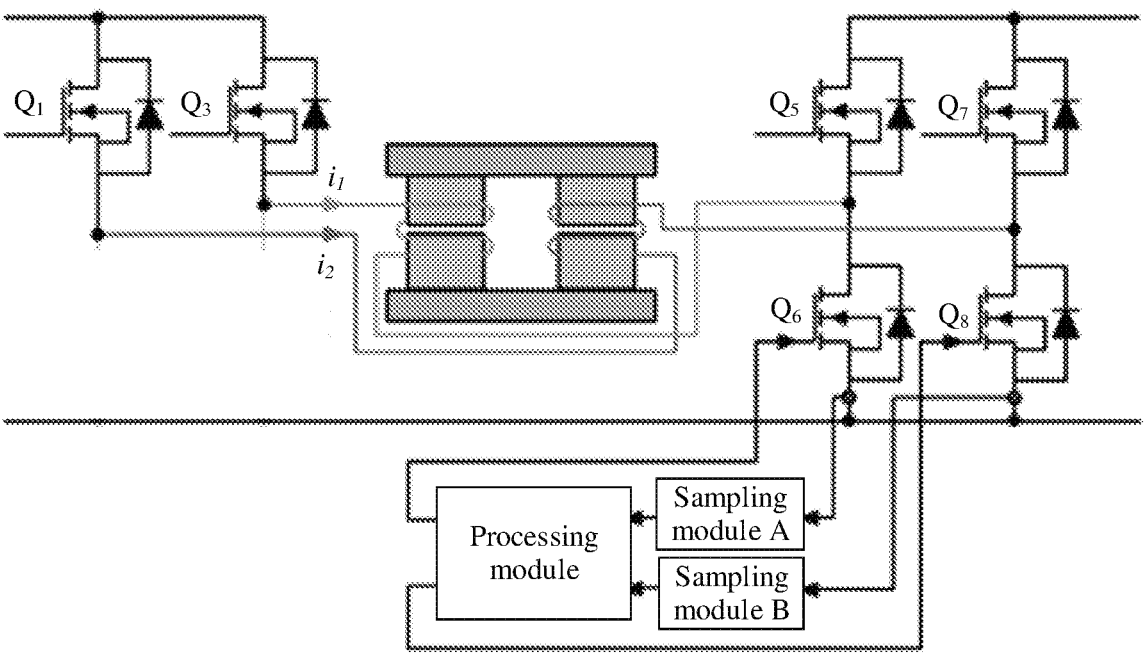
Figure 5:
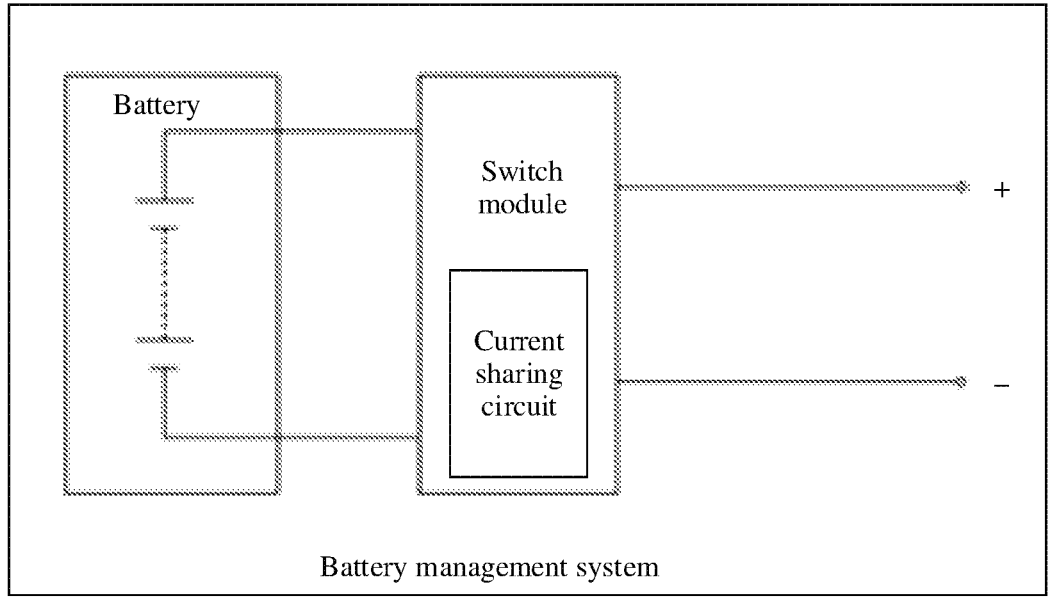

FIG. if is a schematic cross-sectional diagram of another inductor according to an embodiment of this application;

FIG. 2 is a schematic diagram of an embodiment of a current sharing circuit according to an embodiment of this application;

FIG. 3a is a schematic diagram of a simulation experiment according to an embodiment of this application;

FIG. 3b is a schematic diagram of another simulation experiment according to an embodiment of this application;

FIG. 4a is a schematic diagram of a boost circuit according to an embodiment of this application;

FIG. 4b is a schematic diagram of another boost circuit according to an embodiment of this application;

FIG. 4c is a schematic diagram of another boost circuit according to an embodiment of this application;

FIG. 4d is a schematic diagram of another boost circuit according to an embodiment of this application; and FIG. 5 is a schematic diagram of a battery management system according to an embodiment of this application.

DETAILED DESCRIPTION OF ILLUSTRATIVE EMBODIMENTS

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

Before embodiments of this application are described, the conventional technology is first described.

A direct current/direct current (DC/DC) circuit is widely used in a power supply circuit. Currently, an inductor applied to the power supply circuit faces many challenges. The Gauss's law for magnetism is (=B*S, where (represents a magnetic flux, B represents magnetic induction intensity (also referred to as magnetic flux density, magnetic density for short), and S represents an area. As power output by the power supply circuit increases, a coil in a winding of the inductor needs to carry a relatively large direct current component. However, under a condition that a volume of the inductor is limited, a direct current magnetic flux generated by the direct current component causes magnetic density of a fiber post in the inductor to be excessively high, and saturation occurs, causing current distortion and affecting reliability of a circuit.

To reduce the magnetic density, usually, a quantity of turns of the coil of the winding may be increased, or an operating frequency of the inductor may be increased. However, by increasing the quantity of turns of the coil of the winding, a resistance of the winding simultaneously increases, causing new problems such as a copper loss (also referred to as a variable loss) and heating. To increase an operating frequency of the inductor, a more stringent requirement needs to be raised for a switching transistor in the circuit. In addition, a higher operating frequency of the inductor indicates a greater switching loss of the switching transistor in the circuit.

To resolve the foregoing technical problems, the conventional technology provides a plurality of solutions, which are separately described in the following.

A cross-sectional area of a single magnetic core (also referred to as a fiber post) is increased, or a plurality of discrete magnetic cores are used instead of a single magnetic core. In this solution, although the foregoing technical problems can be resolved, a volume of the inductor is large, causing many limitations on an application scenario of the inductor, and material costs of the inductor are relatively high.

The magnetic core uses a high saturation magnetic density material. The foregoing technical problems can be resolved by using the high saturation magnetic density material. However, currently, a common high saturation magnetic density material is a powder core material, an amorphous material, a nano-crystalline material, or a silicon steel sheet. However, the high saturation magnetic density material has disadvantages of a relatively high magnetic loss per unit volume, and a significant decrease in an inductance with an increase in a current, causing many limitations on an application scenario of the inductor.

The fiber post uses a high saturation magnetic density material (such as a powder core material), and a magnet yoke uses a low saturation magnetic density material (such as a power ferrite material). During manufacturing of the inductor, there are technical deficiencies such as difficult processing, high costs, a relatively large difference in initial magnetic permeability tolerances between a material of the fiber post and a material of the magnet yoke, and difficulty in controlling a tolerance of a finished inductor.

Figure 1A:
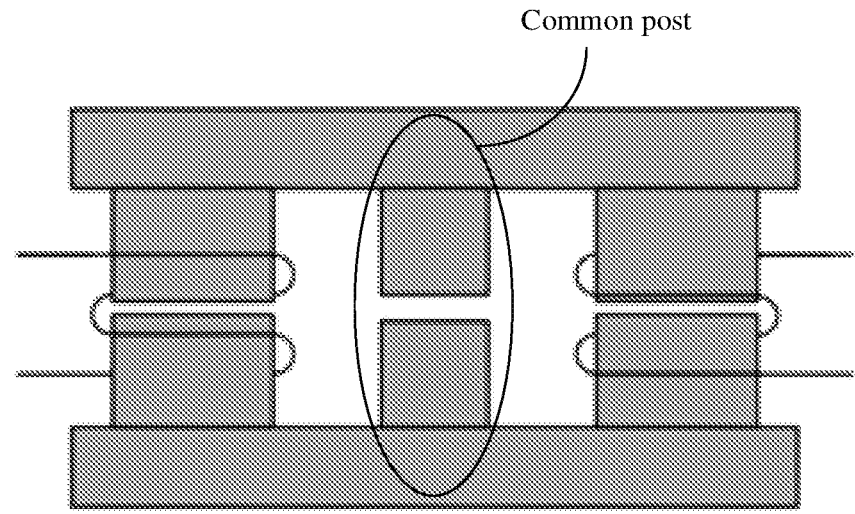
FIG. 1a is a schematic diagram of a structure of an inductor in the conventional technology according to an embodiment of this application.

A T-shaped magnet yoke is used in the inductor. For example, FIG. 1a is a schematic diagram of a structure of an inductor in the conventional technology according to an embodiment of this application. Under some working conditions, a magnetic flux generated by the winding is mutually offset at a part of a common post (a joint of the T-shaped magnet yoke is referred to as a common post). A disadvantage is that a magnetic flux on the fiber post cannot be completely offset, there is still a problem that the magnetic density is excessively high, and saturation occurs.

An operating frequency of the inductor is increased. For example, an ultra-fast power semiconductor element (for example, a gallium nitride GaN power component) is used as a switching transistor in a circuit, and a switching loss is suppressed while a switching frequency is increased. A disadvantage is relatively high component costs. In addition, new problems are introduced, such as an electromagnetic compatibility (EMC) problem and a problem of voltage stress overshoot of the switching transistor.

Inductive ballast shown in a reference document CN2519988Y. The inductive ballast is externally presented as a single inductor. Therefore, coils of two windings are connected in series. To implement normal working under an alternating current working condition, currents in the two windings need to be in opposite conditions, so that a magnetic flux is superimposed on each other. Therefore, in this reference document, the inductive ballast uses a high saturation magnetic density silicon steel sheet to resolve a magnetic core saturation problem. Based on this, the inductive ballast in the reference document cannot resolve the foregoing technical deficiencies.

Based on this, an embodiment of this application provides an inductor and a related apparatus. Compared with the inductor that uses a T-shaped magnet yoke, the inductor provided in this embodiment of this application cancels the common post. Therefore, current distortion caused when magnetic density of the common post is excessively high and saturation occurs is avoided. In addition, a first winding is coupled to a second winding, and a clockwise/counterclockwise direction of a current in the first winding is consistent with a clockwise/counterclockwise direction of a current in the second winding, so that a direct current magnetic flux generated by the first winding in a first fiber post is offset by a direct current magnetic flux generated by the second winding in a second fiber post. This avoids a case in which a direct current magnetic flux generated by a winding in a fiber post causes magnetic density of the fiber post in the inductor to be excessively high, and saturation occurs. Further, a technical deficiency of current distortion caused when magnetic density of the fiber post in the inductor is excessively high and saturation occurs is avoided. Reliability of a circuit to which the inductor is applied is improved. The inductor is enabled to withstand instantaneous overload power without saturation, and a short-time overload capability is improved. An upper magnet yoke and a lower magnet yoke and the fiber post may use an integrated molding technology, having advantages such as simple processing, and high inductance consistency of a finished inductor.

Figure 1B:
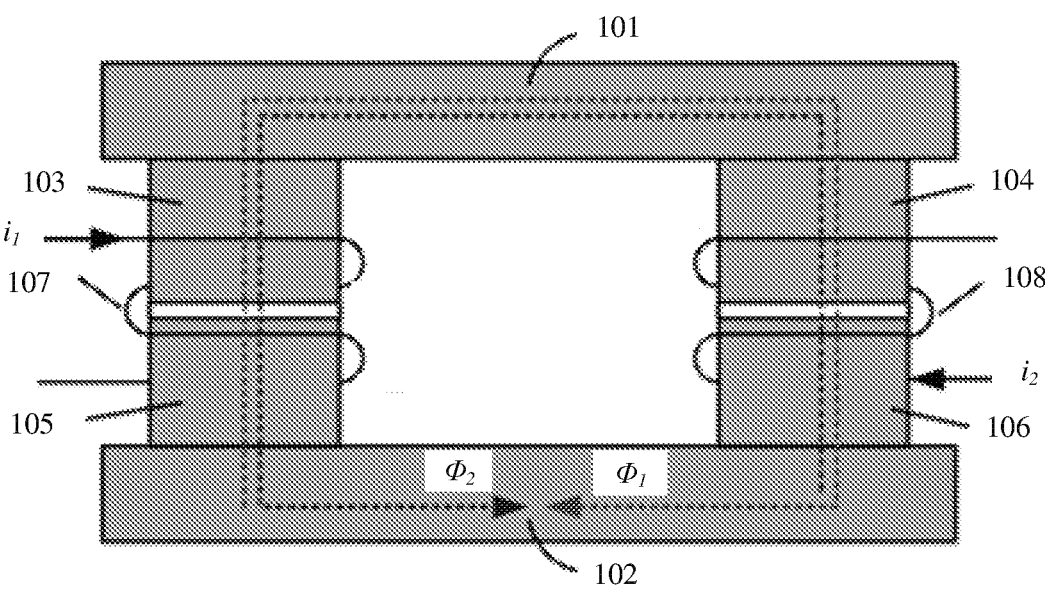
FIG. 1b is a schematic diagram of a structure of an inductor according to an embodiment of this application.

The following describes in detail embodiments of this application with reference to accompanying drawings. FIG. 1*b* is a schematic diagram of a structure of an inductor according to an embodiment of this application. The inductor provided in this embodiment of this application includes an upper magnet yoke 101, a lower magnet yoke 102, a first upper fiber post 103, a second upper fiber post 104, a first lower fiber post 105, a second lower fiber post 106, a first winding 107, and a second winding 108.

The upper magnet yoke 101 and the lower magnet yoke 102 are described as follows: The upper magnet yoke 101 and the lower magnet yoke 102 are straight-shaped magnet yokes, and the upper magnet yoke 101 and the lower magnet yoke 102 are disposed in parallel.

The first fiber post is described as follows: The first winding 107 is disposed on the first fiber post, the first fiber post is disposed between the upper magnet yoke 101 and the lower magnet yoke 102, and the first winding 107 includes a multi-turn coil. Specifically, the first fiber post includes the first upper fiber post 103, the first lower fiber post 105, and a first air gap. An upper end of the first upper fiber post 103 is connected to the upper magnet yoke 101, and a lower end of the first lower fiber post 105 is connected to the lower magnet yoke 102. The first upper fiber post 103, the first lower fiber post 105, and the first air gap are located on a same axis, and the first air gap is provided between the first upper fiber post 103 and the first lower fiber post 105. Optionally, the first air gap includes one or more air gaps.

The second fiber post is described as follows: The second winding 108 is disposed on the second fiber post, the second fiber post is disposed between the upper magnet yoke 101 and the lower magnet yoke 102, and the second winding 108 includes a multi-turn coil. Specifically, the second fiber post includes the second upper fiber post 104, the second lower fiber post 106, and a second air gap. An upper end of the second upper fiber post 104 is connected to the upper magnet yoke 101, and a lower end of the second lower fiber post 106 is connected to the lower magnet yoke 102. The second upper fiber post 104, the second lower fiber post 106, and the second air gap are located on a same axis, and the second air gap is provided between the second upper fiber post 104 and the second lower fiber post 106. Optionally, the second air gap includes one or more air gaps.

In this embodiment of this application, a specific position of an air gap in the fiber post is not limited. The first air gap and the second air gap may be symmetric, or may be asymmetric.

It should be noted that, in this embodiment of this application, a quantity of turns of a coil in the first winding 107 is not limited, and a quantity of turns of a coil in the second winding 108 is not limited. In this embodiment of this application, a diameter of a coil in the first winding 107 is not limited, and a diameter of a coil in the second winding 108 is not limited. In this embodiment of this application, a material of a coil in the first winding 107 is not limited, and a material of a coil in the second winding 108 is not limited.

In another optional implementation, the first upper fiber post 103, the second upper fiber post 104, and the upper magnet yoke 101 are integrally molded. The first lower fiber post 105, the second lower fiber post, and the lower magnet yoke 102 are integrally molded. Optionally, a sintering manner is used for integrated molding. Optionally, a magnetic core pressing manner is used for integrated molding.

In an optional implementation, the first fiber post, the second fiber post, the upper magnet yoke 101, and the lower magnet yoke 102 use a same magnetic material, for example, a power ferrite material such as a manganese zinc ferrite material, or may be a material such as ferrite, silicon steel, an amorphous material, ferrosilicon aluminum, ferrosilicon, or a nano-crystalline material.

Optionally, a phase difference between a current in the first winding 107 and a current in the second winding 108 is 180°.

The first winding 107 is coupled to the second winding 108. Specifically, the first winding 107 is reversely coupled to the second winding 108. A clockwise/counterclockwise direction of a current (i1) in the first winding 107 is consistent with a clockwise/counterclockwise direction of a current (i2) in the second winding 108. For example, in FIG. 1*b*, the current i1 is in a counterclockwise direction, and the current i2 is in a counterclockwise direction, so that a direct current magnetic flux ($\varphi1$) generated by the first winding

107 in the first fiber post is offset by a direct current magnetic flux ($\varphi$2) generated by the second winding 108 in the second fiber post.

Figure 1C:
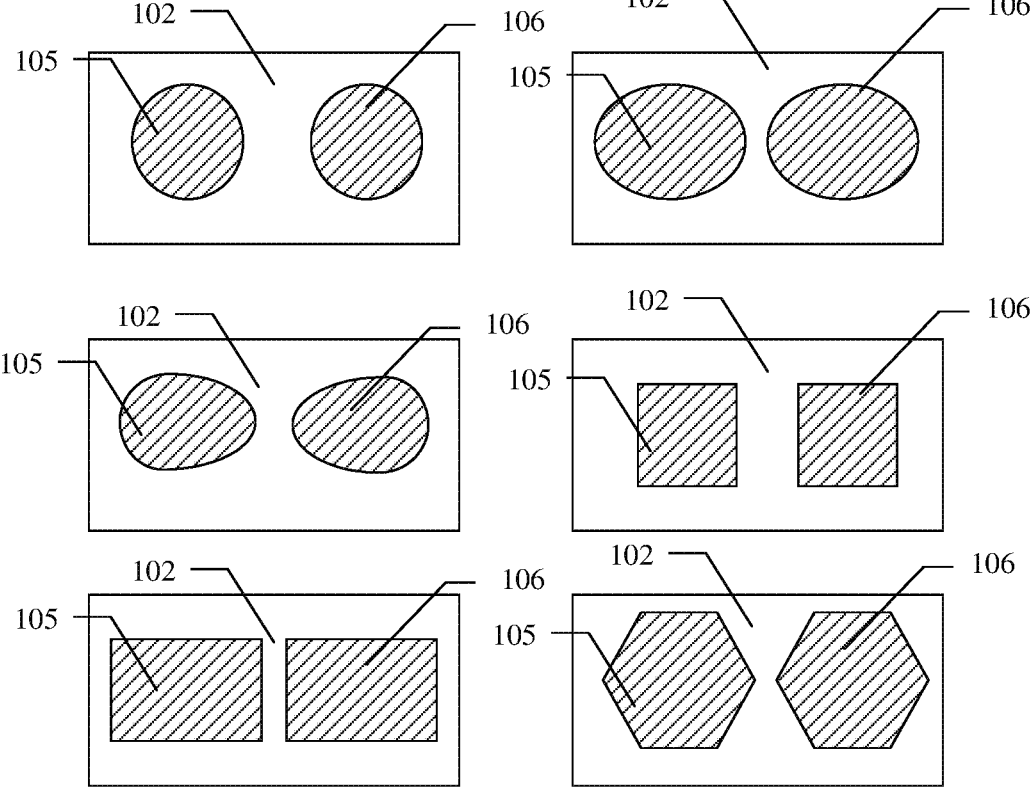
FIG. 1c is a schematic cross-sectional diagram of an inductor according to an embodiment of this application.

Optionally, FIG. 1*c* is a schematic cross-sectional diagram of an inductor according to an embodiment of this application. In FIG. 1*c*, cross sections of the first lower fiber post 105 and the second lower fiber post 106 in the inductor are used as examples for description. A cross-sectional shape of the first fiber post includes a circular shape, an oval shape, an ovoid shape, a quadrate shape, a rectangular shape, or a polygonal shape. A cross-sectional shape of the second fiber post includes a circular shape, an oval shape, an ovoid shape, a quadrate shape, a rectangular shape, or a polygonal shape.

A coupling coefficient of the inductor is negatively correlated with a spacing between fiber posts. Specifically, the coupling coefficient of the inductor may be adjusted by using the spacing between the fiber posts. An example in which the inductor includes the first fiber post and the second fiber post is used for description. The coupling coefficient of the inductor is increased by reducing a spacing between the first fiber post and the second fiber post. The coupling coefficient of the inductor is reduced by increasing the spacing between the first fiber post and the second fiber post.

In this embodiment of this application, the first winding and the second winding are mutually independent. The clockwise/counterclockwise direction of the current in the first winding is consistent with the clockwise/counterclockwise direction of the current in the second winding, so that the direct current magnetic flux generated by the first winding in the first fiber post is offset by the direct current magnetic flux generated by the second winding in the second fiber post, thereby significantly improving an anti-saturation capability of the inductor. The inductor can obtain higher output power while a quantity of turns of a winding is relatively small, a volume of a magnetic core is relatively small, and a low-cost power ferrite magnetic material is used. The upper magnet yoke and the lower magnet yoke and the fiber post may use an integrated molding technology, having advantages such as simple processing, and high inductance consistency of a finished inductor. Further, the coupling coefficient of the inductor may be adjusted by adjusting the spacing between the fiber posts, and requirements of different inductances and offsetting a magnetic flux in the circuit are met.

Figure 1D:
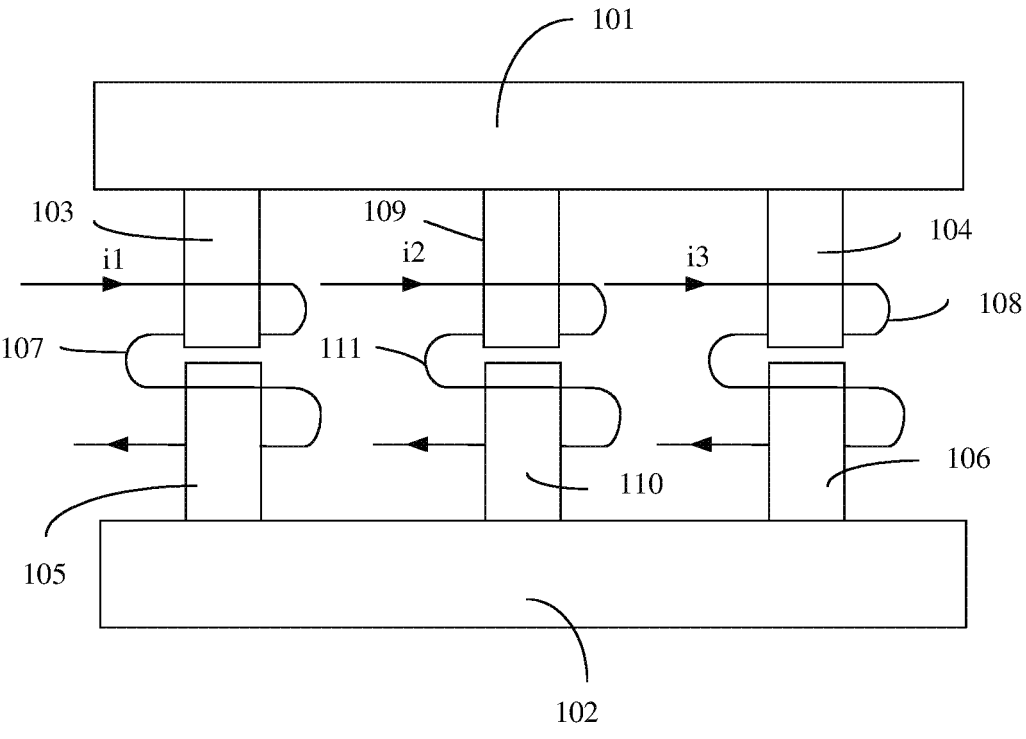
FIG. 1d is a schematic diagram of an embodiment of another inductor according to an embodiment of this application.

Based on the inductor shown in FIG. 1*b* and FIG. 1*c*, the inductor provided in this embodiment of this application may further include a plurality of fiber posts and corresponding windings. For ease of understanding, refer to FIG. 1*d*. FIG. 1*d* is a schematic diagram of an embodiment of another inductor according to an embodiment of this application. The inductor further includes at least one third fiber post and at least one third winding 11. The third winding 11 is disposed on the third fiber post, and a structure of the third fiber post is consistent with a structure of the second fiber post. In FIG. 1*d*, the third fiber post includes a third upper fiber post 109 and a third lower fiber post 110. An upper end of the third upper fiber post 109 is connected to the upper magnet yoke 101, and a lower end of the third lower fiber post 110 is connected to the lower magnet yoke 102.

The structure of the third fiber post is similar to the structure of the second fiber post, and a structure of the third winding 111 is similar to a structure of the second winding. Therefore, similarly, in this embodiment of this application, a quantity of turns of a coil in the third winding i1 is not limited. In this embodiment of this application, a diameter of a coil in the third winding 11 is not limited. In this embodiment of this application, a material of a coil in the third winding 111 is not limited.

In another optional implementation, the first upper fiber post 103, the second upper fiber post 104, the third upper fiber post 109, and the upper magnet yoke 101 are integrally molded. The first lower fiber post 105, the second lower fiber post 106, the third lower fiber post 110, and the lower magnet yoke 102 are integrally molded. Optionally, a sintering manner is used for integrated molding. Optionally, a magnetic core pressing manner is used for integrated molding.

In an optional implementation, the first fiber post, the second fiber post, the third fiber post, the upper magnet yoke 101, and the lower magnet yoke 102 use a same magnetic material.

Optionally, a phase difference between a current (i3) in the third winding in and a current in the second winding is 120°, a phase difference between the current (i3) in the third winding in and a current in the first winding is 120°, and a phase difference between the current in the second winding and the current in the first winding is 120°.

The first winding 107, the second winding 108, and the third winding in are mutually coupled. The clockwise/counterclockwise direction of the current (i1) in the first winding 107, the clockwise/counterclockwise direction of the current (i2) in the second winding 108, and a clockwise/counterclockwise direction of the current (i3) in the third winding 111 are consistent. For example, in FIG. 1*d*, the current i1 is in a counterclockwise direction, the current i2 is in a counterclockwise direction, and the current i3 is in a counterclockwise direction, so that the direct current magnetic flux generated by the first winding 107 in the first fiber post, the direct current magnetic flux generated by the second winding 108 in the second fiber post, and a direct current magnetic flux generated by the third winding 111 in the third fiber post are offset.

Optionally, a cross-sectional shape of the third fiber post includes a circular shape, an oval shape, an ovoid shape, a quadrate shape, a rectangular shape, or a polygonal shape.

Figure 1E:
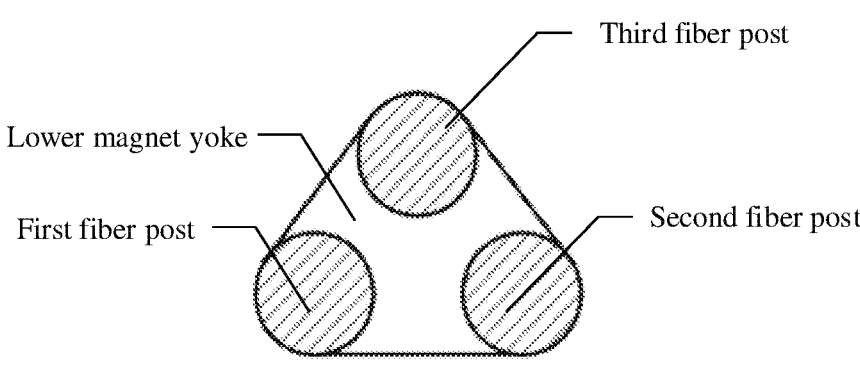
FIG. 1e is a schematic cross-sectional diagram of an inductor according to an embodiment of this application.
Figure 1F:
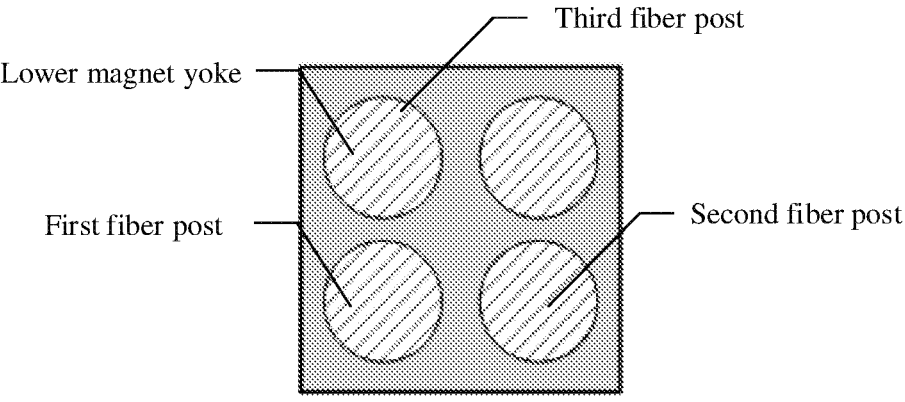

In an optional implementation, in the inductor shown in FIG. 1*d*, the first fiber post, the second fiber post, and the third fiber post may be located on a same axis (similar to FIG. 1*c*). The first fiber post, the second fiber post, and the third fiber post may be alternatively disposed on different axes. For ease of understanding, refer to FIG. 1*e*. FIG. 1*e* is a schematic cross-sectional diagram of an inductor according to an embodiment of this application. In FIG. 1*e*, the first fiber post, the second fiber post, and the third fiber post are arranged in a triangular shape.

It should be noted that the inductor provided in this embodiment of this application may further include more third fiber posts and corresponding third windings 111. A manner of connecting a plurality of third fiber posts and third windings 11 to another component in the inductor is similar to a manner of connecting a single third fiber post and third winding 11 to another component in the inductor. Details are not described herein again. For example, an example in which a quantity of third fiber posts is 2 is used. FIG. if is a schematic cross-sectional diagram of another inductor according to an embodiment of this application.

Optionally, when the quantity of third fiber posts is N, a quantity of the third windings 11 is N. In this case, a phase difference between the current (i3) in the third winding 11 and the current in the second winding is 360°/N, a phase difference between the current (i3) in the third winding 11 and the current in the first winding is 360°/N, and a phase difference between the current in the second winding and the current in the first winding is 360°/N, where N is a positive integer.

In this embodiment of this application, the first winding, the second winding, and the third winding are mutually independent. The clockwise/counterclockwise direction of the current in the first winding, the clockwise/counterclockwise direction of the current in the second winding, and the clockwise/counterclockwise direction of the current in the third winding are consistent, so that the direct current magnetic flux generated by the first winding in the first fiber post, the direct current magnetic flux generated by the second winding in the second fiber post, and the direct current magnetic flux generated by the third winding in the third fiber post are offset, thereby significantly improving an anti-saturation capability of the inductor. The inductor can obtain higher output power while a quantity of turns of a winding is relatively small, a volume of a magnetic core is relatively small, and a low-cost power ferrite magnetic material is used. The upper magnet yoke and the lower magnet yoke and the fiber post may use an integrated molding technology, having advantages such as simple processing, and high inductance consistency of a finished inductor. Further, the coupling coefficient of the inductor may be adjusted by adjusting the spacing between the fiber posts, and requirements of different inductances and offsetting a magnetic flux in the circuit are met.

Based on the embodiment shown in FIG. 1b to FIG. if, an embodiment of this application further provides a current sharing circuit. The current sharing circuit is configured to perform current sharing control for a plurality of windings, so that a same current can flow through different winding branches. FIG. 2 is a schematic diagram of an embodiment of a current sharing circuit according to an embodiment of this application. The current sharing circuit provided in this embodiment of this application includes a sampling module 201, a processing module 202, an inductor 203, and a main transistor 204. The inductor 203 is the inductor described in the foregoing embodiment shown in FIG. 1b to FIG. if.

Specifically, the main transistor is configured to control connection and disconnection of a current in the inductor, and each winding in the inductor is corresponding to one main transistor.

The sampling module is configured to perform current sampling on a first winding and a second winding of the inductor to respectively obtain a first current signal and a second current signal. The first current signal is a signal of a current in the first winding, and the second current signal is a signal of a current in the second winding.

The processing module is configured to adjust a duty cycle of a main transistor of the first winding and a duty cycle of a main transistor of the second winding based on the first current signal and the second current signal, so that a direct current component of the current of the first winding is consistent with a direct current component of the current of the second winding.

When the inductor further includes a third winding, the sampling module is further configured to perform current sampling on the third winding of the inductor to obtain a third current signal. The third current signal is a signal of a current in the third winding. The processing module is further configured to adjust the duty cycle of the main transistor of the first winding, the duty cycle of the main transistor of the second winding, and a duty cycle of a main transistor of the third winding based on the first current signal, the second current signal, and the third current signal, so that the direct current component of the current of the first winding, the direct current component of the current of the second winding, and a direct current component of the current of the third winding are consistent.

Specifically, the sampling module includes at least one Hall sensor, at least one current transformer, at least one resistive current divider, or at least one magnetoresistive current sensor.

In an optional implementation, an analog solution may be used in the current sharing circuit. In this case, the processing module includes at least one error operational amplifier.

In another optional implementation, a digital solution may be used in the current sharing circuit. In this case, the processing module includes at least one micro controller unit (MCU).

For example, FIG. 3a is a schematic diagram of a simulation experiment according to an embodiment of this application. An example in which the inductor includes a first fiber post (and the first winding) and a second fiber post (and the second winding) is used. FIG. 3a shows waveforms of currents in the first winding and the second winding when the inductor is not applied to the current sharing circuit. A horizontal coordinate of FIG. 3a represents time, a vertical coordinate represents a current value, "ton" represents a connection time, "Ts" represents a periodicity, and a duty cycle is a ratio of the connection time to the periodicity, that is, "ton/Ts". "I1" represents a direct current component of a current i1, and "I2" represents a direct current component of a current i2. Under a precondition that the current sharing circuit provided in this embodiment of this application is not introduced, different windings in the inductor provided in this embodiment of this application may have inconsistent direct current components caused by different component parameters. Consequently, a magnetic flux in the fiber post cannot be completely offset, causing a technical deficiency that magnetic density in the fiber post is excessively high and saturation occurs. After the current sharing circuit provided in this embodiment of this application is applied, refer to FIG. 3b. FIG. 3b is a schematic diagram of another simulation experiment according to an embodiment of this application. The current sharing circuit adjusts the duty cycle of the main transistor of the first winding and the duty cycle of the main transistor of the second winding based on the first current signal and the second current signal, so that the direct current component of the current of the first winding is consistent with the direct current component of the current of the second winding. Therefore, a technical deficiency that magnetic density in the fiber post is excessively high and saturation occurs when a magnetic flux in the fiber post cannot be completely offset because of inconsistent direct current components caused by different component parameters is overcome.

In this embodiment of this application, the current sharing circuit provided in this embodiment of this application may be applied to the inductor provided in this embodiment of this application. Real-time dynamic adjustment of a direct current magnetic flux in the inductor is implemented by using the current sharing circuit, to resolve a problem of current non-equalization and magnetic bias saturation caused by unbalanced component parameters, so that circuit reliability is further improved.

Based on the current sharing circuit shown in FIG. 2, there are a plurality of possible implementations of sampling points of the sampling module in the current sharing circuit. An example in which the current sharing circuit provided in this embodiment of this application is applied to a boost chopper circuit (also referred to as a boost circuit) is used, to describe different sampling manners of a current in the current sharing circuit. It should be noted that there may also be a plurality of different current sampling manners when the current sharing circuit is applied to another circuit. A specific sampling manner is similar to that when the current sharing circuit is applied to the boost circuit. Details are not described herein again. The boost circuit is a switching direct current boost circuit that can enable an output voltage to be higher than an input voltage. The boost circuit is mainly used in direct current motor transmission, a single-phase power factor correction (PFC) circuit, and another alternating current/direct current power supply. FIG. 4a is a schematic diagram of a boost circuit according to an embodiment of this application. Q1 and Q3 are always connected transistors, Q6 and Q8 are main transistors of the boost circuit, Q5 and Q7 are synchronization transistors of the boost circuit, L1 is the first winding of the inductor provided in this embodiment of this application, and L2 is the second winding of the inductor provided in this embodiment of this application. Specifically, Q6 is a main transistor of L1, and Q8 is a main transistor of L2.

In an optional implementation, FIG. 4b is a schematic diagram of another boost circuit according to an embodiment of this application. When the current sharing circuit provided in this embodiment of this application is applied to the boost circuit, a sampling module A is configured to perform sampling on the current (i1) of the first winding to obtain the first current signal, and a sampling module B is configured to perform sampling on the current (i2) of the second winding to obtain the second current signal. The processing module is configured to adjust the duty cycle of the main transistor of the first winding and the duty cycle of the main transistor of the second winding based on the first current signal and the second current signal. Specifically, a sampling point of the sampling module is between the inductor and each of Q1 and Q3, and a sampled current is a current of each winding.

In an optional implementation, FIG. 4c is a schematic diagram of another boost circuit according to an embodiment of this application. When the current sharing circuit provided in this embodiment of this application is applied to the boost circuit, the sampling module A is configured to perform sampling on the current (i1) of the first winding to obtain the first current signal, and the sampling module B is configured to perform sampling on the current (i2) of the second winding to obtain the second current signal. The processing module is configured to adjust the duty cycle of the main transistor of the first winding and the duty cycle of the main transistor of the second winding based on the first current signal and the second current signal. Specifically, the sampling point of the sampling module is on a bus of an input power supply in the boost circuit, and the sampled current is a total loop current of the boost circuit.

In an optional implementation, FIG. 4d is a schematic diagram of another boost circuit according to an embodiment of this application. When the current sharing circuit provided in this embodiment of this application is applied to the boost circuit, the sampling module A is configured to perform sampling on the current (i1) of the first winding to obtain the first current signal, and the sampling module B is configured to perform sampling on the current (i2) of the second winding to obtain the second current signal. The processing module is configured to adjust the duty cycle of the main transistor of the first winding and the duty cycle of the main transistor of the second winding based on the first current signal and the second current signal. Specifically, the sampling point of the sampling module is in a connection loop of Q6 and Q8, and the sampled current is a main transistor current.

An embodiment of this application further provides a direct current/direct current switch power supply. The direct current/direct current switch power supply includes the current sharing circuit in the foregoing embodiments.

An embodiment of this application further provides a modular power supply. The modular power supply includes the current sharing circuit in the foregoing embodiments.

An embodiment of this application further provides a battery management system. FIG. 5 is a schematic diagram of a battery management system according to an embodiment of this application. The battery management system includes a battery and a switch module, and the current sharing circuit in the foregoing embodiments is applied to the switch module. The battery is configured to provide electric energy. The current sharing circuit is configured to control charging and discharging of the battery. Specifically, the current sharing circuit is integrated into the switch module of the battery management system, to implement bidirectional current control and bidirectional boost or buck output by controlling turning on and turning off of a switching transistor. Optionally, the switch module may be integrated with the battery, or may separately form an independent module.

It may be clearly understood by a person skilled in the art that, for convenience and brevity of description, for a specific working process of the foregoing system, apparatus, and unit, refer to a corresponding process in the method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

In conclusion, the foregoing descriptions are merely preferred examples of embodiments of the technical solutions of this application, but are not intended to limit the protection scope of this application. Any modification, equivalent replacement, or improvement made without departing from the spirit and principle of this application shall fall within the protection scope of this application.

The invention claimed is:

1. An inductor, comprising:

an upper magnet yoke and a lower magnet yoke, wherein the upper magnet yoke and the lower magnet yoke are straight-shaped magnet yokes, and wherein the upper magnet yoke and the lower magnet yoke are disposed in parallel;

a first fiber post, wherein a first winding is disposed on the first fiber post, and the first fiber post is disposed between the upper magnet yoke and the lower magnet yoke; and a second fiber post, wherein a second winding is disposed on the second fiber post, and the second fiber post is disposed between the upper magnet yoke and the lower magnet yoke;

wherein the first fiber post comprises a first upper fiber post, a first lower fiber post, and a first air gap, wherein the first upper fiber post, the first lower fiber post, and the first air gap are located on a same axis, wherein the first air gap is provided between the first upper fiber post and the first lower fiber post, and wherein the first air gap comprises one or more air gaps;

wherein the second fiber post comprises a second upper fiber post, a second lower fiber post, and a second air gap, wherein the second upper fiber post, the second lower fiber post, and the second air gap are located on a same axis, wherein the second air gap is provided between the second upper fiber post and the second lower fiber post, and wherein the second air gap comprises one or more air gaps;

wherein the upper magnet yoke, the first upper fiber post, and the second upper fiber post are integrally molded;

wherein the lower magnet yoke, the first lower fiber post, and the second lower fiber post are integrally molded;

wherein the first winding is coupled to the second winding; and wherein a direction of a current in the first winding in either a clockwise or counterclockwise direction is consistent with a clockwise or counterclockwise direction of a current in the second winding, wherein a direct current magnetic flux generated by the first winding in the first fiber post is offset by a direct current magnetic flux generated by the second winding in the second fiber post.

2. The inductor according to claim 1, wherein:

the upper magnet yoke, the first upper fiber post, and the second upper fiber post are integrally molded in a sintering manner, and wherein the lower magnet yoke, the first lower fiber post, and the second lower fiber post are integrally molded in a sintering manner; or the upper magnet yoke, the first upper fiber post, and the second upper fiber post are integrally molded in a magnetic core pressing manner, and wherein the lower magnet yoke, the first lower fiber post, and the second lower fiber post are integrally molded in a magnetic core pressing manner.

3. The inductor according to claim 1, wherein the upper magnet yoke, the lower magnet yoke, the first fiber post, and the second fiber post comprise a power ferrite material or a powder core material.

4. The inductor according to claim 1, wherein the inductor further comprises at least one third fiber post and at least one third winding, and wherein the third winding is disposed on the third fiber post; and wherein the clockwise or counterclockwise direction of the current in the first winding, the clockwise or counterclockwise direction of the current in the second winding, and a clockwise or counterclockwise direction of a current in the third winding are consistent, wherein the direct current magnetic flux generated by the first winding in the first fiber post, the direct current magnetic flux generated by the second winding in the second fiber post, and a direct current magnetic flux generated by the third winding in the third fiber post are offset.

5. The inductor according to claim 2, wherein the inductor further comprises at least one third fiber post and at least one third winding, and wherein the third winding is disposed on the third fiber post; and the clockwise or counterclockwise direction of the current in the first winding, the clockwise or counterclockwise direction of the current in the second winding, and a clockwise or counterclockwise direction of a current in the third winding are consistent, wherein the direct current magnetic flux generated by the first winding in the first fiber post, the direct current magnetic flux generated by the second winding in the second fiber post, and a direct current magnetic flux generated by the third winding in the third fiber post are offset.

6. The inductor according to claim 4, wherein a phase difference between currents in two windings is 180° based on the inductor comprising two fiber posts and two windings;

a phase difference between currents in three windings is 120° based on the inductor comprising three fiber posts and three windings; and a phase difference between currents in N windings is 360°/N, wherein N is a positive integer, based on the inductor comprising N fiber posts and N windings.

7. The inductor according to claim 1, wherein a cross-sectional shape of the first fiber post comprises a circular shape, an oval shape, an ovoid shape, a quadrate shape, a rectangular shape, or a polygonal shape; and a cross-sectional shape of the second fiber post comprises a circular shape, an oval shape, an ovoid shape, a quadrate shape, a rectangular shape, or a polygonal shape.

8. The inductor according to claim 1, wherein a coupling coefficient of the inductor is negatively correlated with a spacing between fiber posts, wherein the coupling coefficient of the inductor is increased by reducing the spacing between the fiber posts, and wherein the coupling coefficient of the inductor is reduced by increasing the spacing between the fiber posts.

9. A current sharing circuit, comprising;

a main transistor;

a sampling module;

a processing module; and an inductor, comprising:

an upper magnet yoke and a lower magnet yoke, wherein the upper magnet yoke and the lower magnet yoke are straight-shaped magnet yokes, and the upper magnet yoke and the lower magnet yoke are disposed in parallel;

a first fiber post, wherein a first winding is disposed on the first fiber post, and the first fiber post is disposed between the upper magnet yoke and the lower magnet yoke; and a second fiber post, wherein a second winding is disposed on the second fiber post, and the second fiber post is disposed between the upper magnet yoke and the lower magnet yoke;

wherein the first fiber post comprises a first upper fiber post, a first lower fiber post, and a first air gap, wherein the first upper fiber post, the first lower fiber post, and the first air gap are located on a same axis, wherein the first air gap is provided between the first upper fiber post and the first lower fiber post, and wherein the first air gap comprises one or more air gaps;

the second fiber post comprises a second upper fiber post, a second lower fiber post, and a second air gap, the second upper fiber post, wherein the second lower fiber post, and the second air gap are located on a same axis, wherein the second air gap is provided between the second upper fiber post and the second lower fiber post, and wherein the second air gap comprises one or more air gaps;

wherein the upper magnet yoke, the first upper fiber post, and the second upper fiber post are integrally molded;

wherein the lower magnet yoke, the first lower fiber post, and the second lower fiber post are integrally molded;

wherein the first winding is coupled to the second winding; and wherein a direction of a current in the first winding in either a clockwise or counterclockwise direction is consistent with a clockwise or counterclockwise direction of a current in the second winding, wherein a direct current magnetic flux generated by the first winding in the first fiber post is offset by a direct current magnetic flux generated by the second winding in the second fiber post;

wherein the main transistor is configured to control connection and disconnection of a current in the inductor, and each winding in the inductor corresponds to one main transistor;

wherein the sampling module is configured to perform current sampling on the first winding and the second winding of the inductor to respectively obtain a first current signal and a second current signal, wherein the first current signal is a signal of a current in the first winding, and the second current signal is a signal of a current in the second winding; and wherein the processing module is configured to adjust a duty cycle of the main transistor of the first winding and a duty cycle of the main transistor of the second winding based on the first current signal and the second current signal, wherein a direct current component of the current of the first winding is consistent with a direct current component of the current of the second winding, and a direct current magnetic flux generated by the first winding in the first fiber post is dynamically offset in real time by a direct current magnetic flux generated by the second winding in the second fiber post.

10. The current sharing circuit according to claim 9, wherein the sampling module is further configured to perform, based on the inductor further comprising a third winding, current sampling on the third winding of the inductor to obtain a third current signal, wherein the third current signal is a signal of a current in the third winding; and the processing module is further configured to adjust, based on the inductor further comprising a third winding, the duty cycle of the main transistor of the first winding, the duty cycle of the main transistor of the second winding, and a duty cycle of the main transistor of the third winding based on the first current signal, the second current signal, and the third current signal, wherein the direct current component of the current of the first winding, the direct current component of the current of the second winding, and a direct current component of the current of the third winding are consistent.

11. The current sharing circuit according to claim 9, wherein the sampling module comprises at least one Hall sensor, at least one current transformer, at least one resistive current divider, or at least one magnetoresistive current sensor.

12. The current sharing circuit according to claim 9, wherein the processing module comprises at least one operational amplifier or at least one micro controller unit.

13. A battery management system, comprising:

a battery; and a current sharing circuit configured to control charging and discharging of the battery, comprising at least one main transistor;

a sampling module;

a processing module; and an inductor, comprising:

an upper magnet yoke and a lower magnet yoke, wherein the upper magnet yoke and the lower magnet yoke are straight-shaped magnet yokes, and wherein the upper magnet yoke and the lower magnet yoke are disposed in parallel;

a first fiber post, wherein a first winding is disposed on the first fiber post, and the first fiber post is disposed between the upper magnet yoke and the lower magnet yoke; and a second fiber post, wherein a second winding is disposed on the second fiber post, and the second fiber post is disposed between the upper magnet yoke and the lower magnet yoke;

wherein the first fiber post comprises a first upper fiber post, a first lower fiber post, and a first air gap, wherein the first upper fiber post, the first lower fiber post, and the first air gap are located on a same axis, wherein the first air gap is provided between the first upper fiber post and the first lower fiber post, and wherein the first air gap comprises one or more air gaps;

wherein the second fiber post comprises a second upper fiber post, a second lower fiber post, and a second air gap, wherein the second upper fiber post, the second lower fiber post, and the second air gap are located on a same axis, wherein the second air gap is provided between the second upper fiber post and the second lower fiber post, and wherein the second air gap comprises one or more air gaps;

wherein the upper magnet yoke, the first upper fiber post, and the second upper fiber post are integrally molded;

wherein the lower magnet yoke, the first lower fiber post, and the second lower fiber post are integrally molded;

wherein the first winding is coupled to the second winding;

wherein a direction of a current in the first winding in either a clockwise or counterclockwise direction is consistent with a clockwise or counterclockwise direction of a current in the second winding, wherein a direct current magnetic flux generated by the first winding in the first fiber post is offset by a direct current magnetic flux generated by the second winding in the second fiber post;

wherein each main transistor of the at least one the main transistor is configured to control connection and disconnection of a current in the inductor, and each winding in the inductor corresponds to a main transistor of the at least one main transistor;

wherein the sampling module is configured to perform current sampling on the first winding and the second winding of the inductor to respectively obtain a first current signal and a second current signal, wherein the first current signal is a signal of a current in the first winding, and the second current signal is a signal of a current in the second winding; and wherein the processing module is configured to adjust a duty cycle of the main transistor of the first winding and a duty cycle of the main transistor of the second winding based on the first current signal and the second current signal, wherein a direct current component of the current of the first winding is consistent with a direct current component of the current of the second winding, and wherein a direct current magnetic flux generated by the first winding in the first fiber post is dynamically offset in real time by a direct current magnetic flux generated by the second winding in the second fiber post.

14. The current sharing circuit according to claim 9, wherein:

the upper magnet yoke, the first upper fiber post, and the second upper fiber post are integrally molded in a sintering manner, and wherein the lower magnet yoke, the first lower fiber post, and the second lower fiber post are integrally molded in a sintering manner; or the upper magnet yoke, the first upper fiber post, and the second upper fiber post are integrally molded in a magnetic core pressing manner, and wherein the lower magnet yoke, the first lower fiber post, and the second lower fiber post are integrally molded in a magnetic core pressing manner.

15. The current sharing circuit according to claim 9, wherein the upper magnet yoke, the lower magnet yoke, the first fiber post, and the second fiber post comprise a power ferrite material or a powder core material.

16. The current sharing circuit according to claim 9, wherein a cross-sectional shape of the first fiber post comprises a circular shape, an oval shape, an ovoid shape, a quadrate shape, a rectangular shape, or a polygonal shape; and a cross-sectional shape of the second fiber post comprises a circular shape, an oval shape, an ovoid shape, a quadrate shape, a rectangular shape, or a polygonal shape.

17. The current sharing circuit according to claim 9, wherein a coupling coefficient of the inductor is negatively correlated with a spacing between fiber posts, wherein the coupling coefficient of the inductor is increased by reducing the spacing between the fiber posts, and wherein the coupling coefficient of the inductor is reduced by increasing the spacing between the fiber posts.

18. The battery management system according to claim 13, wherein:

the upper magnet yoke, the first upper fiber post, and the second upper fiber post are integrally molded in a sintering manner, and wherein the lower magnet yoke, the first lower fiber post, and the second lower fiber post are integrally molded in a sintering manner; or the upper magnet yoke, the first upper fiber post, and the second upper fiber post are integrally molded in a magnetic core pressing manner, and wherein the lower magnet yoke, the first lower fiber post, and the second lower fiber post are integrally molded in a magnetic core pressing manner.

19. The battery management system according to claim 13, wherein the upper magnet yoke, the lower magnet yoke, the first fiber post, and the second fiber post comprise a power ferrite material or a powder core material.

20. The battery management system according to claim 13, wherein a cross-sectional shape of the first fiber post comprises a circular shape, an oval shape, an ovoid shape, a quadrate shape, a rectangular shape, or a polygonal shape; and a cross-sectional shape of the second fiber post comprises a circular shape, an oval shape, an ovoid shape, a quadrate shape, a rectangular shape, or a polygonal shape.

* * * * *